(12) United States Patent
Eberhard et al.

(10) Patent No.: US 10,239,455 B2
(45) Date of Patent: Mar. 26, 2019

(54) REACTIVE SMART REAR VIEW DISPLAY MIRROR

(71) Applicant: Panasonic Automotive Systems Company of America, Division of Panasonic Corporation of North America, Peachtree City, GA (US)

(72) Inventors: Jason D. Eberhard, Cartersville, GA (US); John Avery, Newnan, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 25 days.

(21) Appl. No.: 15/679,453

(22) Filed: Aug. 17, 2017

(65) Prior Publication Data

US 2018/0050639 A1 Feb. 22, 2018

Related U.S. Application Data

(60) Provisional application No. 62/376,966, filed on Aug. 19, 2016.

(51) Int. Cl.
*B60R 1/06* (2006.01)
*G06F 3/01* (2006.01)
*B60W 50/14* (2012.01)
*G06K 9/00* (2006.01)
*B60R 1/00* (2006.01)

(52) U.S. Cl.
CPC .................. *B60R 1/06* (2013.01); *B60R 1/00* (2013.01); *B60W 50/14* (2013.01); *G06F 3/012* (2013.01); *G06F 3/013* (2013.01); *G06K 9/00845* (2013.01); *B60R 2300/306* (2013.01); *B60R 2300/8046* (2013.01); *B60W 2050/146* (2013.01)

(58) Field of Classification Search
CPC ... B60R 1/06; B60W 50/14; B60W 2050/146; G06F 3/012; G06F 3/013
USPC ......................................................... 340/462
See application file for complete search history.

(56) References Cited

U.S. PATENT DOCUMENTS

| | | | | |
|---|---|---|---|---|
| 5,978,017 | A * | 11/1999 | Tino | B60R 1/00 348/148 |
| 9,475,389 | B1 * | 10/2016 | Fung | B60K 35/00 |
| 9,517,776 | B2 * | 12/2016 | Graumann | B60W 50/08 |
| 9,654,740 | B2 * | 5/2017 | Galarraga | B60R 1/00 |

* cited by examiner

*Primary Examiner* — John A Tweel, Jr.
(74) *Attorney, Agent, or Firm* — Laurence S. Roach, Esq.

(57) ABSTRACT

A motor vehicle includes a driver sensor detecting a position of a human driver of the motor vehicle. A rear view camera captures images of an environment behind the motor vehicle. A display screen is disposed within a passenger compartment of the motor vehicle. An electronic processor is communicatively coupled to each of the driver sensor, the rear view camera, and the display screen. The electronic processor receives images captured by the rear view camera, receives outputs of the driver sensor, determines a position of the driver's head or eyes dependent upon the outputs of the driver sensor, and transmits video signals to the display screen. The video signals are dependent upon the determined position of the driver's head or eyes and dependent upon images captured by the rear view camera.

15 Claims, 6 Drawing Sheets

REACTIVE SMART REAR VIEW DISPLAY MIRROR

CROSS-REFERENCED TO RELATED APPLICATIONS

This application claims benefit of U.S. Provisional Application No. 62/376,966 filed on Aug. 19, 2016, which the disclosure of which is hereby incorporated by reference in its entirety for all purposes.

FIELD OF THE INVENTION

The disclosure relates to providing a rearview display in a motor vehicle.

BACKGROUND OF THE INVENTION

Vehicles are known to include smart mirrors, which include advantages over traditional mirrors, such as glare reduction, increased brightness at night, better object detection, etc. FIG. 1 illustrates the backup field of view of such a smart mirror arrangement 10 of the prior art, including a vehicle 12 having side view mirrors 14a-b, rearview mirror display 16, a steering wheel 18 and a rear facing camera 20. The images presented by rear view mirror display 16 are dependent upon images captured by two cameras 20. One camera 20 has a limited, straight-on field of view 22, and another camera 20 has a limited, straight-on displayed field of view 24 upon which the images presented by rear view mirror display 16 are based.

SUMMARY

The present invention may include displaying to a driver images captured by a wide angle camera. An image including an angle less than the maximum view angle of the wide angle camera may be captured and utilized to present a computer-flattened image on a display, such as a smart rear view mirror. The angle and direction of the presented view are dependent upon the head position of the intended human viewer of the display. This head position may be determined based upon images captured by a camera observing the intended viewer and/or based upon the outputs of various other types of driver sensors, such seat pressure sensors, sensors that determine the positions of the intended viewer's hands, lidar-based sensors, radar-based sensors, and ultrasonic-based sensor, for example.

In one embodiment, the invention comprises a motor vehicle including a driver sensor detecting a position of a human driver of the motor vehicle. A rearview camera captures images of an environment behind the motor vehicle. A display screen is disposed within a passenger compartment of the motor vehicle. An electronic processor is communicatively coupled to each of the driver sensor, the rear view camera, and the display screen. The electronic processor receives images captured by the rear view camera, receives outputs of the driver sensor, determines a position of the driver's head or eyes dependent upon the outputs of the driver sensor, and transmits video signals to the display screen. The video signals are dependent upon the determined position of the driver's head or eyes and dependent upon images captured by the rear view camera.

In another embodiment, the invention comprises a method of operating a motor vehicle, including capturing images of an environment behind the motor vehicle. A position of the driver's head or eyes is sensed. A display screen is provided within a passenger compartment of the motor vehicle. Images are presented on the display screen dependent upon the sensed position of the driver's head or eyes, and dependent upon the images captured of the environment behind the motor vehicle.

In yet another embodiment, the invention comprises a motor vehicle including a driver sensor detecting a position of a human driver of the motor vehicle. A rear view camera captures images of an environment behind the motor vehicle. The rear view camera has a wide angle field of view. A display screen is disposed within a passenger compartment of the motor vehicle. An electronic processor is communicatively coupled to each of the driver sensor, the rear view camera, and the display screen. The electronic processor receives images captured by the rear view camera, receives outputs of the driver sensor, determines a position of the driver's head or eyes dependent upon the outputs of the driver sensor, selects a portion of the wide angle field of view of the rear view camera based upon the determined position of the driver's head or eyes, and transmits video signals to the display screen. The video signals are dependent upon images captured by the rear view camera within the selected portion of the wide angle field of view of the rear view camera.

An advantage of the present invention is that it may provide a natural mirror effect to a smart mirror display. This may enable better visual information to be provided to the driver.

The invention may include all the same advantages over traditional mirrors as possessed by smart mirrors, such as glare reduction, increased brightness at night, improved object detection, etc. In addition, the present invention may provide the driver with the ability to see any part of the entire 180-degree rear field of view. The invention may also provide a "zoom in" function in which the displayed field of view is narrowed when the driver's head moves toward the mirror. The inventive display may have all of the advantages of a static smart rear display, may react to the driver's movement like a traditional mirror, but may provide a much wider field of view than a traditional mirror.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
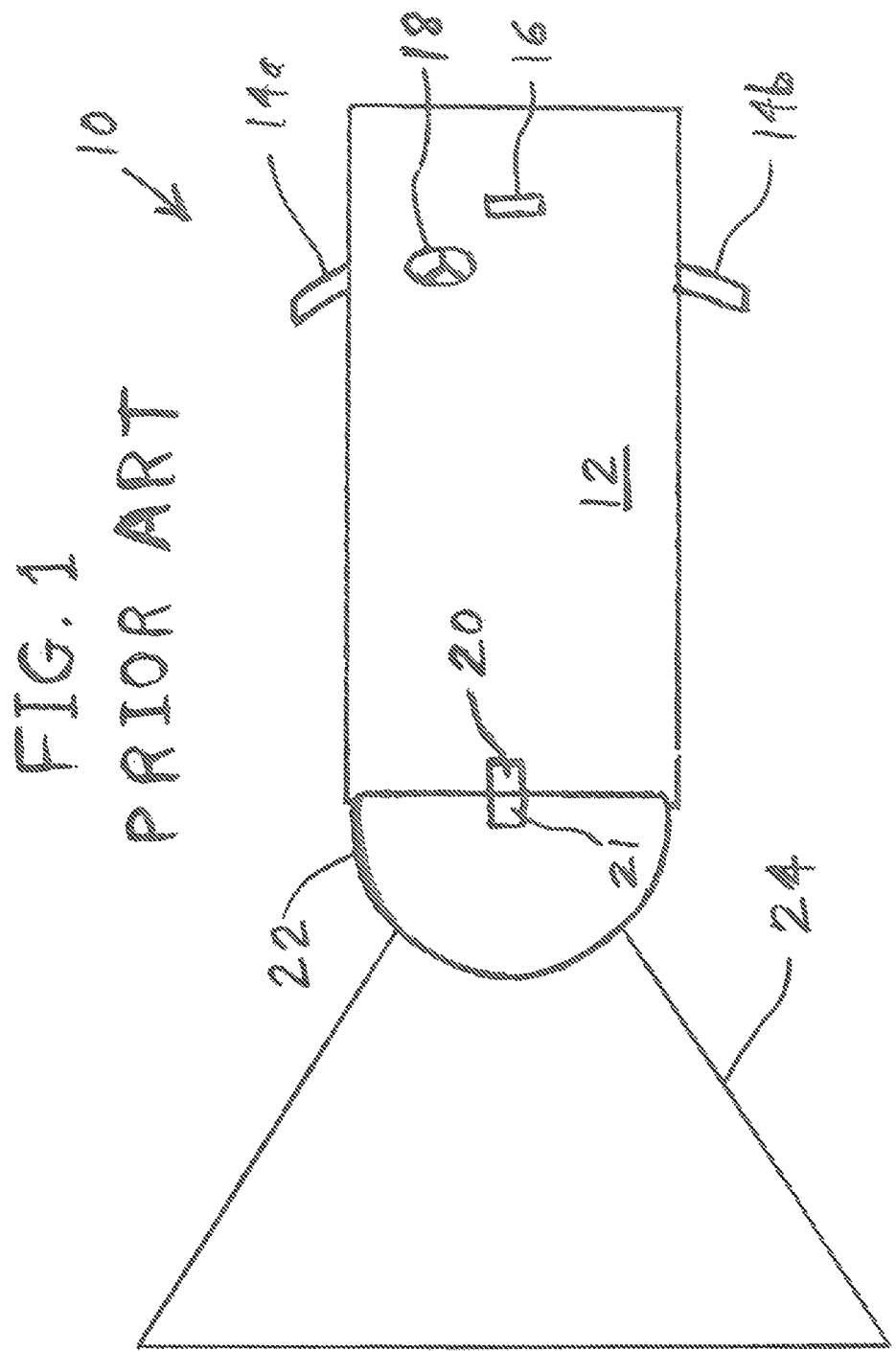
FIG. 1 is an overhead schematic view of one embodiment of a backup field of view of a smart mirror arrangement of the prior art.
Figure 2:
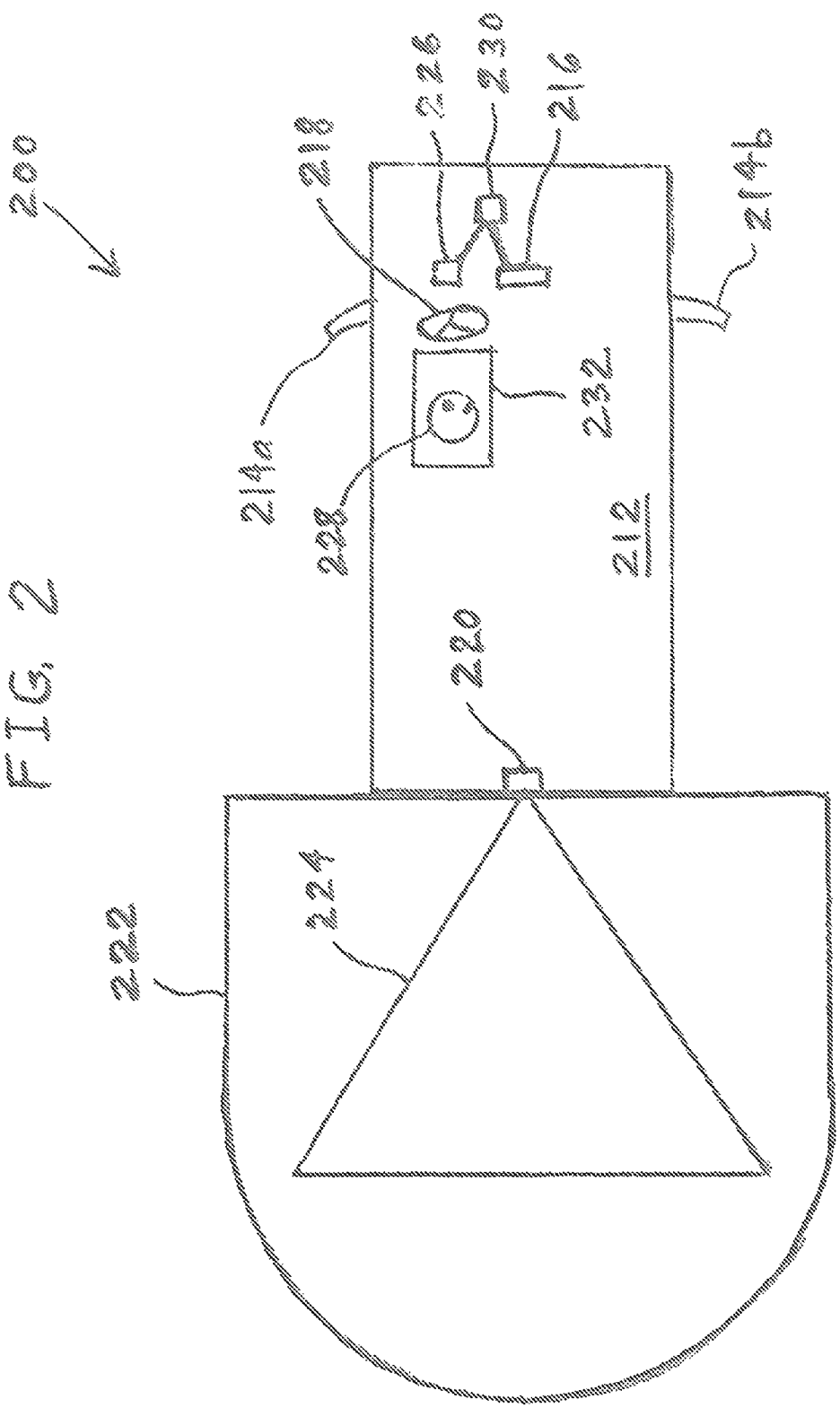
FIG. 2 is an overhead schematic view of one embodiment of a backup field of view of a reactive smart rear view display mirror arrangement of the present invention with the head of the driver centered over the driver's seat.

FIG. 2 illustrates the backup field of view of one embodiment of a reactive smart rear view display mirror arrangement 200 of the present invention, including a vehicle 212 having side view mirrors 214a-b, a rear view mirror display 216, a wide angle, rear facing camera 220, and a driver camera 226. Driver camera 226 captures images of a driver 228 of vehicle 212. The images presented by rear view mirror display 216 may be dependent upon images captured by camera 220 and images captured by camera 226. Camera 220 has a wide angle field of view 222 and a straight-on displayed field of view 224 upon which the images presented by rear view mirror display 216 are based. An electronic processor 230 may receive images captured by cameras 220, 226, and may produce, based on these received images, images to be presented on rear view mirror display 216. As determined by processor 230 based on images captured by camera 226, a head of driver 228 is laterally centered with respect to a driver's seat 232 and is disposed near the back of seat 232 (e.g., touching or adjacent to a head rest of seat 232). With this position of the head of driver 228, processor 230 causes the images presented on rear view mirror display 216 to be representative of the straight-on displayed field of view 224, and unrepresentative of the remainder of the image within wide angle field of view 222.

Figure 3:
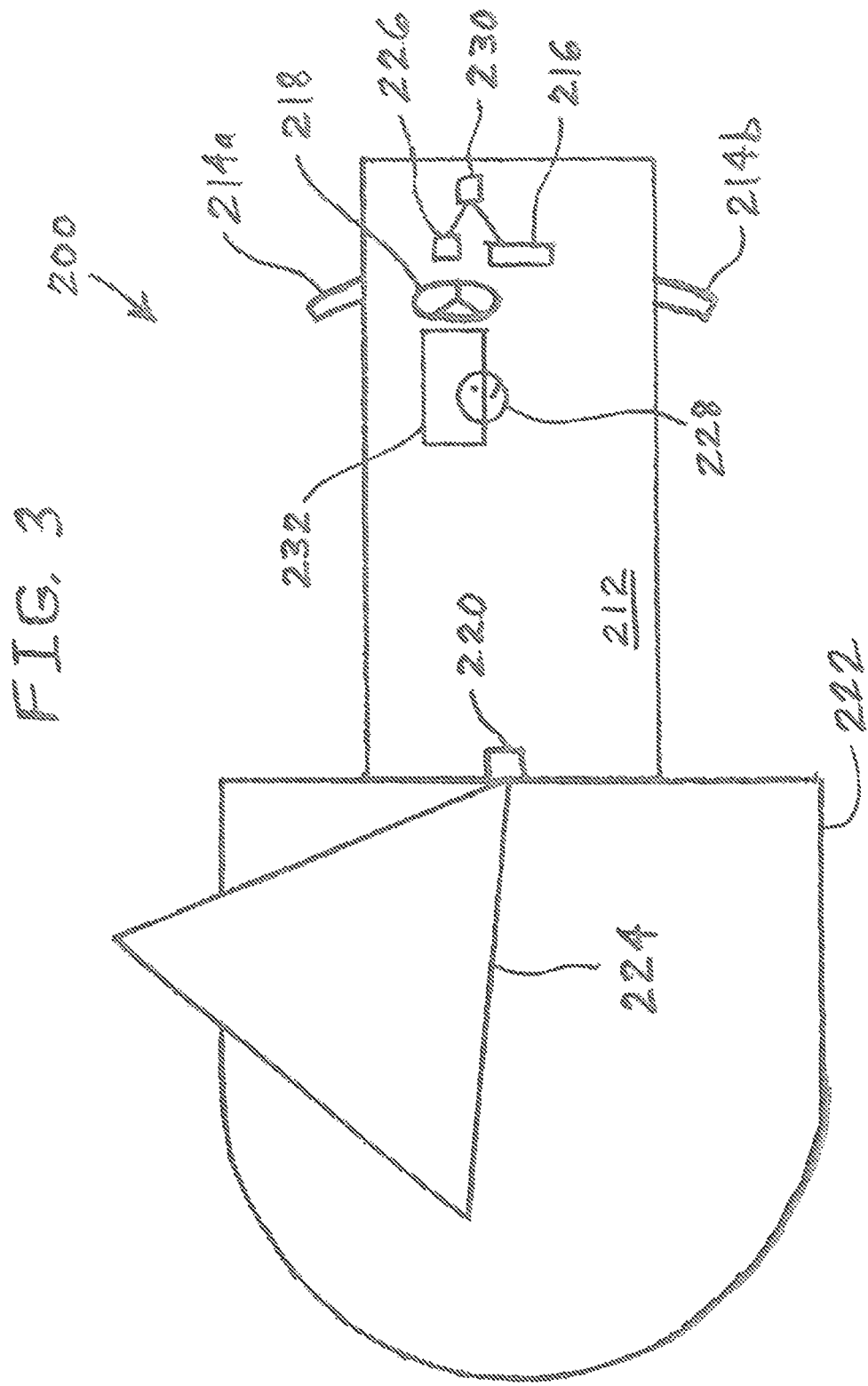
FIG. 3 is an overhead schematic view of one embodiment of the backup field of view of the reactive smart rear view display mirror arrangement of FIG. 2 with the head of the driver positioned over the right side of the driver's seat.

FIG. 3 illustrates the change in the backup field of view of reactive smart rear view display mirror arrangement 200 in response to driver 228 moving his head to a position over the right-hand side of driver's seat 232, as determined by processor 230 and based on images captured by camera 226. In response to determining, based on images captured by camera 226, that a head of driver 228 is offset in the right-hand direction with respect to driver's seat 232 and is disposed near the back of seat 232, processor 230 causes the images presented on rear view mirror display 216 to be representative of the angled displayed field of view 224 shown in FIG. 3, and unrepresentative of the remainder of the image within wide angle field of view 222. The angled displayed field of view 224 shown in FIG. 3 is biased to the left-hand side of vehicle 212, and may be indicative of the field of view that driver 228 would have through a traditional, reflecting rear view mirror with his head offset to the right and if there were no obstructions caused by the body of vehicle 212. That is, the displayed field of view 224 follows the natural "mirror" effect.

Figure 4:
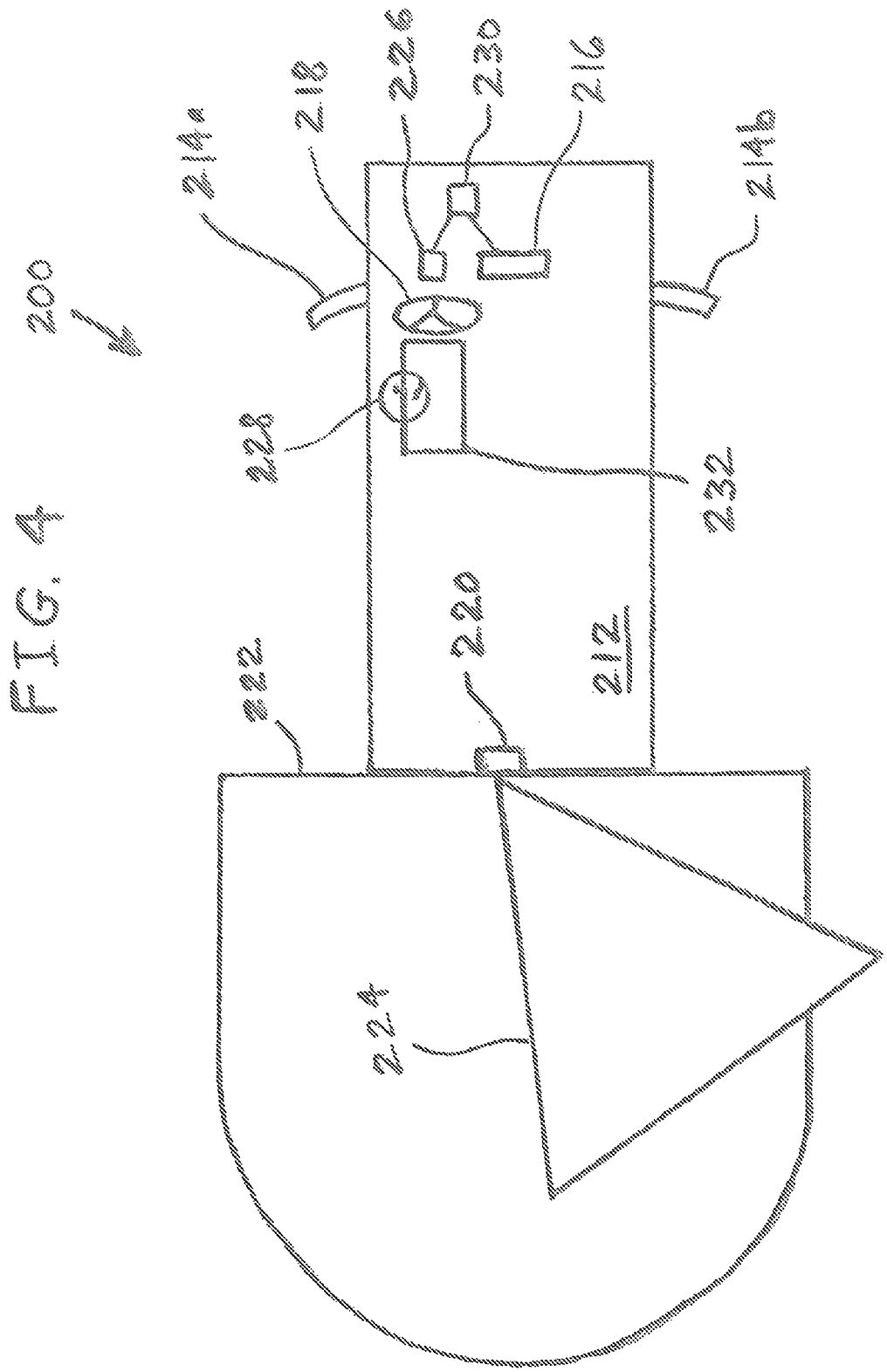
FIG. 4 is an overhead schematic view of one embodiment of the backup field of view of the reactive smart rear view display mirror arrangement of FIG. 2 with the head of the driver positioned over the left side of the driver's seat.

FIG. 4 illustrates the change in the backup field of view of reactive smart rear view display mirror arrangement 200 in response to driver 228 moving his head to a position over the left-hand side of driver's seat 232, as determined by processor 230 and based on images captured by camera 226. In response to determining, based on images captured by camera 226, that a head of driver 228 is offset in the left-hand direction with respect to driver's seat 232 and is disposed near the back of seat 232, processor 230 causes the images presented on rear view mirror display 216 to be representative of the angled displayed field of view 224 shown in FIG. 4, and unrepresentative of the remainder of the image within wide angle field of view 222. The angled displayed field of view 224 shown in FIG. 4 is biased to the right-hand side of vehicle 212, and may be indicative of the field of view that driver 228 would have through a traditional, reflecting rear view mirror with his head offset to the left and if there were no obstructions caused by the body of vehicle 212 is, the displayed field of view 224 follows the natural "mirror" effect.

Figure 5:
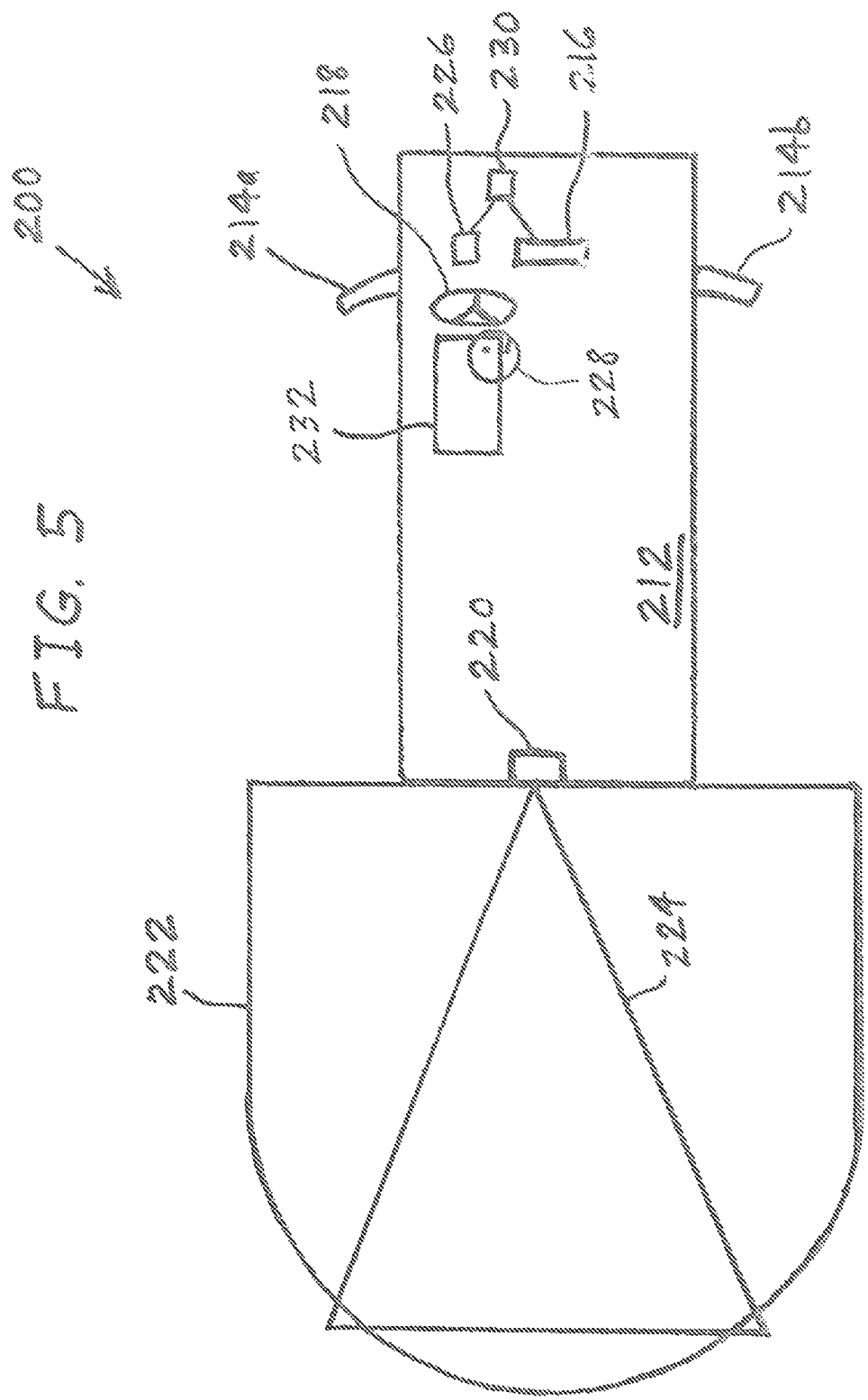
FIG. 5 is an overhead schematic view of one embodiment of the backup field of view of the reactive smart rear view display mirror arrangement of FIG. 2 with the head of the driver positioned over the right side and front edge of the driver's seat.

FIG. 5 illustrates the change in the backup field of view of reactive smart rear view display mirror arrangement 200 in response to driver 228 moving his head to a position over the right-hand front corner of driver's seat 232, as determined by processor 230 and based on images captured by camera 226. In response to determining, based on images captured by camera 226, that a head of driver 228 is offset in the right-hand direction with respect to driver's seat 232 and is disposed near the front of seat 232 (e.g., the head of driver 228 head of driver 226 has moved toward rear view mirror display 216), processor 230 causes the images presented on rear view mirror display 216 to be representative of the straight-on but narrowed displayed field of view 224 shown in FIG. 5, and unrepresentative of the remainder of the image within wide angle field of view 222. The narrowed displayed field of view 224 shown in FIG. 5 may be indicative of the field of view that driver 228 would have through a traditional, reflecting rear view mirror with his head having moved closer to the mirror. Accordingly, the present invention may provide a "zoom in" effect by narrowing the displayed field of view.

In one embodiment, the amount of shift performed and/or allowed may be regulated by the speed of the vehicle. The speed of the vehicle may regulate both the angle of field of views presented and the maximum left/right swing of the view presented on the display.

Figure 6:
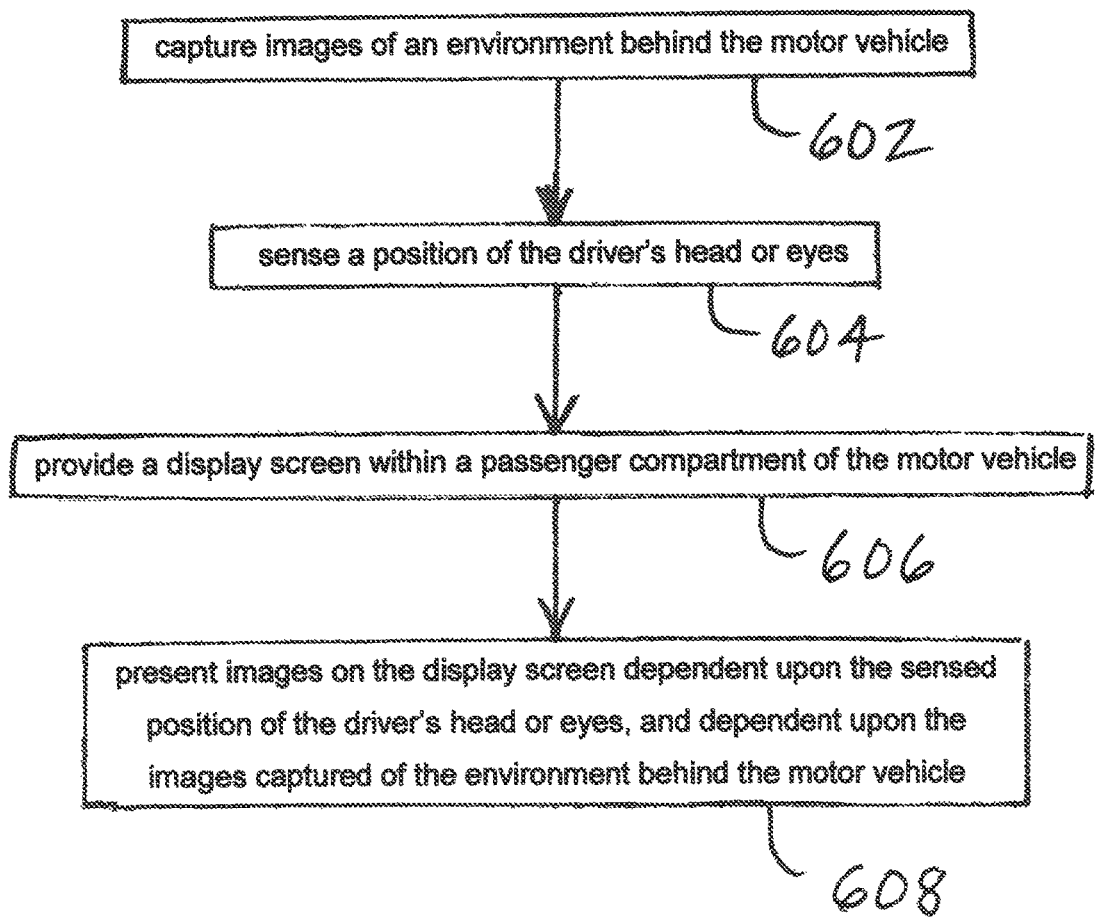
FIG. 6 is a flow chart of one embodiment of a method of the present invention for operating a motor vehicle.

FIG. 6 is a flow chart of one embodiment of a method 600 of the present invention for operating a motor vehicle. In a first step 602, images of an environment behind the motor vehicle are captured. For example, camera 220 may capture images of the scene behind vehicle 212.

In a next step 604, a position of the driver's head or eyes is sensed. For example, driver camera 226 captures images of a driver 228. Processor 230 may then determine, based on the images captured by camera 226, a position of a head or eyes of driver 228.

Next, in step 606, a display screen is provided within a passenger compartment of the motor vehicle. For example, a rear view mirror display screen 216 may be provided within a passenger compartment of vehicle 212.

In a final step 608, images are presented on the display screen dependent upon the sensed position of the driver's head or eyes, and dependent upon the images captured of the environment behind the motor vehicle. For example, in response to determining, based on images captured by camera 226, that a head of driver 228 is offset in a particular direction with respect to driver's seat 232, processor 230 may cause the images presented on rear view mirror display 216 to be representative of a selected angled displayed field of view 224, and unrepresentative of the remainder of the image within wide angle field of view 222.

The invention has been described herein as presenting images dependent upon a position of the driver. However, it is also possible within the scope of the invention for images to be presented dependent upon a state of the vehicle, such as the vehicle's speed, yaw, and/or gear position. For example, the amount of shift performed on the presented images, or allowed in the presented images, may be regulated by the speed of the vehicle. Both the angle of field of views presented and maximum left/right swing of the view presented on the display may also be regulated by the speed of the vehicle.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A motor vehicle, comprising:
    a driver sensor configured to detect a position of a human driver of the motor vehicle;
    a rear view camera configured to capture images of an environment behind the motor vehicle;
    a display screen disposed within a passenger compartment of the motor vehicle; and
    an electronic processor communicatively coupled to each of the driver sensor, the rear view camera, and the display screen, the electronic processor being configured to:
        receive images captured by the rear view camera;
        receive outputs of the driver sensor;
        determine a position of the driver's head or eyes dependent upon the outputs of the driver sensor;
        transmit video signals to the display screen, the video signals being dependent upon the determined position of the driver's head or eyes and dependent upon images captured by the rear view camera;
        select a portion of a field of view of the rear view camera, the selecting being dependent upon the determined position of the driver's head or eyes;
        shift the selected portion of a field of view of the rear view camera toward a left-hand side of the motor vehicle in response to the driver moving his head toward a right-hand side of the motor vehicle, and
        shift the selected portion of a field of view of the rear view camera toward a right-hand side of the motor vehicle in response to the driver moving his head toward a left-hand side of the motor vehicle.

2. A motor vehicle, comprising:
    a driver sensor configured to detect a position of a human driver of the motor vehicle;
    a rear view camera configured to capture images of an environment behind the motor vehicle;
    a display screen disposed within a passenger compartment of the motor vehicle; and
    an electronic processor communicatively coupled to each of the driver sensor, the rear view camera, and the display screen, the electronic processor being configured to:
        receive images captured by the rear view camera;
        receive outputs of the driver sensor;
        determine a position of the driver's head or eyes dependent upon the outputs of the driver sensor;
        transmit video signals to the display screen, the video signals being dependent upon the determined position of the driver's head or eyes and dependent upon images captured by the rear view camera; and
        select a portion of a field of view of the rear view camera, the selecting being dependent upon the determined position of the driver's head or eyes, wherein there is a positive correlation between a broadness of the selected portion of the field of view of the rear view camera and a distance from the driver's head or eyes to the display screen.

3. The motor vehicle of claim 2 wherein the electronic processor is configured to produce and transmit video signals including images within the selected portion of a field of view of the rear view camera.

4. The motor vehicle of claim 2 wherein the electronic processor is configured to select a portion of a field of view of the rear view camera to match a field of view that would be presented to the driver if the display screen were a mirror, given the determined position of the driver's head or eyes.

5. The motor vehicle of claim 2 wherein the rear view camera comprises a fish-eye camera with a hemispherical field of view.

6. A method of operating a motor vehicle, the method comprising:
    capturing images of an environment behind the motor vehicle;
    sensing a position of the driver's head or eyes;
    providing a display screen within a passenger compartment of the motor vehicle;
    presenting images on the display screen dependent upon the sensed position of the driver's head or eyes, and dependent upon the images captured of the environment behind the motor vehicle;
    selecting a portion of a field of view of a rear view camera that captures the images of the environment behind the motor vehicle, the selecting being dependent upon the sensed position of the driver's head or eyes;
    shifting the selected portion of a field of view of the rear view camera toward a left-hand side of the motor vehicle in response to the driver moving his head toward a right-hand side of the motor vehicle, and
    shifting the selected portion of a field of view of the rear view camera toward a right-hand side of the motor vehicle in response to the driver moving his head toward a left-hand side of the motor vehicle.

7. A method of operating a motor vehicle, the method comprising:
    capturing images of an environment behind the motor vehicle;
    sensing a position of the driver's head or eyes;
    providing a display screen within a passenger compartment of the motor vehicle;
    presenting images on the display screen dependent upon the sensed position of the driver's head or eyes, and dependent upon the images captured of the environment behind the motor vehicle; and
    selecting a portion of a field of view of a rear view camera that captures the images of the environment behind the motor vehicle, the selecting being dependent upon the sensed position of the driver's head or eyes, wherein there is a positive correlation between a broadness of the selected portion of the field of view of the rear view camera and a distance from the driver's head or eyes to the display screen.

8. The method of claim 6 further comprising producing and transmitting video signals including images within the selected portion of a field of view of the rear view camera.

9. The method of claim 6 wherein the selecting step includes selecting a portion of a field of view of the rear view camera to match a field of view that would be presented to the driver if the display screen were a mirror, given the sensed position of the driver's head or eyes.

10. The method of claim 6 wherein the rear view camera comprises a fish-eye camera with a hemispherical field of view.

11. A motor vehicle, comprising:
a driver sensor configured to detect a position of a human driver of the motor vehicle;
a rear view camera configured to capture images of an environment behind the motor vehicle, the rear view camera having a wide angle field of view;
a display screen disposed within a passenger compartment of the motor vehicle; and
an electronic processor communicatively coupled to each of the driver sensor, the rear view camera, and the display screen, the electronic processor being configured to:
receive images captured by the rear view camera;
receive outputs of the driver sensor; determine a position of the driver's head or eyes dependent upon the outputs of the driver sensor;
select a portion of the wide angle field of view of the rear view camera based upon the determined position of the driver's head or eyes;
transmit video signals to the display screen, the video signals being dependent upon images captured by the rear view camera within the selected portion of the wide angle field of view of the rear view camera;
shift the selected portion of the wide angle field of view of the rear view camera toward a left-hand side of the motor vehicle in response to the driver moving his head toward a right-hand side of the motor vehicle, and
shift the selected portion of the wide angle field of view of the rear view camera toward a right-hand side of the motor vehicle in response to the driver moving his head toward a left-hand side of the motor vehicle.

12. A motor vehicle, comprising:
a driver sensor configured to detect a position of a human driver of the motor vehicle;
a rear view camera configured to capture images of an environment behind the motor vehicle, the rear view camera having a wide angle field of view;
a display screen disposed within a passenger compartment of the motor vehicle; and
an electronic processor communicatively coupled to each of the driver sensor, the rear view camera, and the display screen, the electronic processor being configured to;
receive images captured by the rear view camera;
receive outputs of the driver sensor; determine a position of the driver's head or eyes dependent upon the outputs of the driver sensor;
select a portion of the wide angle field of view of the rear view camera based upon the determined position of the driver's head or eyes; and
transmit video signals to the display screen, the video signals being dependent upon images captured by the rear view camera within the selected portion of the wide angle field of view of the rear view camera, wherein there is a positive correlation between a broadness of the selected portion of the wide angle field of view of the rear view camera and a distance from the driver's head or eyes to the display screen.

13. The motor vehicle of claim 12 wherein the electronic processor is configured to produce the video signals.

14. The motor vehicle of claim 12 wherein the electronic processor is configured to select a portion of the wide angle field of view of the rear view camera to match a field of view that would be presented to the driver if the display screen were a mirror, given the determined position of the driver's head or eyes.

15. The motor vehicle of claim 12 wherein the rear view camera comprises a fish-eye camera with a hemispherical field of view.

* * * * *